UNITED STATES PATENT OFFICE

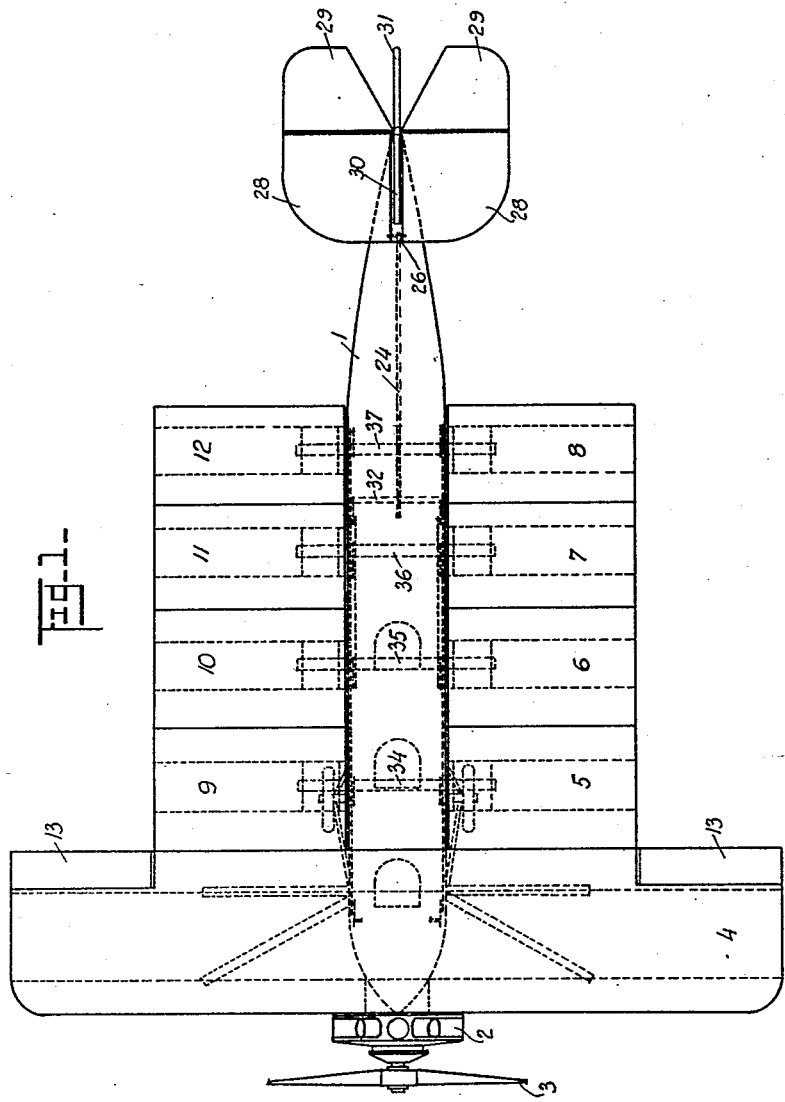

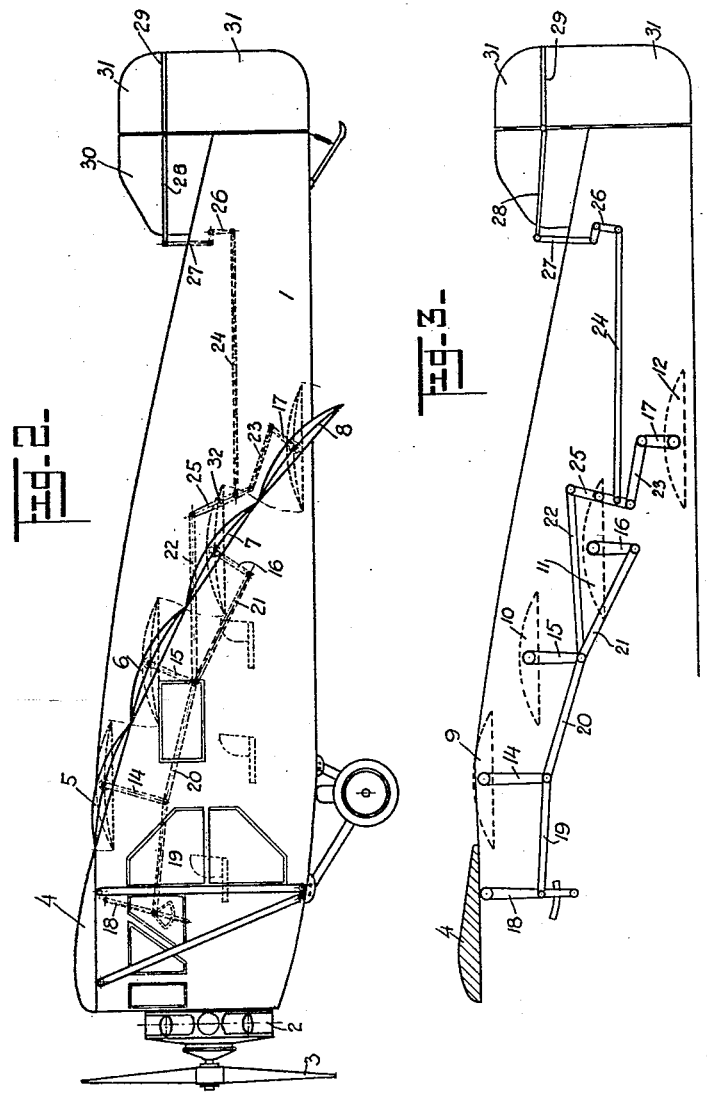

WILLIAM ROBERTS, OF NAUGATUCK, CONNECTICUT

FLYING MACHINE

Application filed March 10, 1930. Serial No. 434,574.

My invention relates to flying machines and has for its object to increase the safety of flying. This object I accomplish by rendering the lift more or less independent of the flying speed in varying the aerodynamic characteristics regarding lift and stability, but without changing the fundamental design and without sacrificing the well-established qualities of the present-day air-craft.

In accordance with my invention, I place back of the leading main wing in the path of the slip-stream, a series of short-span tiltable wings, and utilize the reaction of the slip-stream on these last mentioned wings to create a lift which at standstill will be a function of the slip stream velocity.

I arrange the tiltable wings in staggered formation with a gradually increasing intermediate gap and I provide controlling means for simultaneously varying their inclination from minimum to maximum incidence, that is from a position of substantially equal incidence to a position, in which the incidence increases from wing to wing.

In the latter position, the tiltable wings constitute a substantially unslotted wing curved downward with increasing incidence, and the slip-stream entering the first section of the wing unit is brought to action on the lower camber of an air-foil whose incidence gradually increases from zero to forty five degrees. Thereby, the lifting reaction of the slip-stream is considerably increased.

For maintaining stability, the airplane is provided with a movable stabilizer which by its being connected with the controlling means for the tiltable wings, maintains the craft in longitudinal balance at all angles of incidence. The airplane is in balance with the tiltable wings at maximum incidence. A forward movement of the center of pressure at decreased incidence is balanced by a lift on the tail produced by an increase in the incidence of the stabilizer.

The invention enables the pilot to take off and land at steep angles, to maintain level-controlled flight between zero and maximum flying speed and, in the event of engine trouble, to descend on a steep glide at slow speed thereby avoiding the danger of an uncontrolled nose-dive.

In the annexed drawings, in which, by way of illustration, I have shown an embodiment of my invention, Figure 1 is a top plan view of an airplane constructed in accordance with my invention, Figure 2 a side view, the control-mechanism being shown in dotted lines, and Figure 3 a view of the control mechanism.

In the drawings, there is shown at 1 the fuselage, 2 is the engine and 3 the propeller carried by the engine-shaft.

The stationary main or leading wing is shown at 4. Back of this wing, there are arranged on both sides of the fuselage 1 the short-span tiltable wings, those on the left being indicated by the numerals 5, 6, 7 and 8 and those on the right by the numerals 9, 10, 11 and 12. At 13 in Fig. 1 are shown two ailerons forming part of the stationary main wing. In Figs. 2 and 3 is shown the lever-system for controlling the position of the tiltable wings. Separate levers indicated at 14, 15, 16 and 17 are provided to move the opposed tiltable wings 5 and 9, 6 and 10, 7 and 11 and 8 and 12 respectively. They are connected through links 19, 20, 21, 22 and 23 to a hand-lever 18 located within easy reach of the pilot so that the latter by a displacement of said hand lever 18 can simultaneously vary the positions of the various tiltable wings on both sides of the fuselage.

At 25 is shown a reversing lever, which by means of a rod 24, a bell-crank lever 26 and link 27 is connected to a stabilizer shown at 28. The said reversing lever, as shown in Figs. 2 and 3, forms part of the above described system being pivotally connected with the links shown at 22 and 23 and fulcrumed at 32 which may be termed the control shaft. At 34, 35, 36 and 37 are shown the tubular shafts carrying the tiltable wings and journalled in suitable bearings provided for them in the sides of the fuselage.

At 30 is shown a fin, while at 31 is shown the rudder.

As will be readily understood from the foregoing description, by means of the hand-lever 18, the position and thereby the angle of incidence of all the tiltable wings can be readily and simultaneously varied and at the same time, by means of the rod 24, bell-crank lever 26 and link 27, the position of the stabalizer 28 will be correspondingly varied.

When in the positions shown in full lines in Fig. 2, the tiltable wings are in contact with the adjacent wings forming a perfect curve starting from the rear edge of the stationary main wing 4 this curve is of gradually increasing incidence thus offering a high wind resistance with a resulting high drift. In this position of the wings the maximum lift is produced.

As shown by the broken lines in Fig. 2 and by Fig. 3 the tiltable wings may be rocked from the normal position to a neutral horizontal position, in which position they offer the smallest wind resistance permitting the airplane to move through the air at high speed.

The tiltable wings can, of course, be moved to any angular position intermediate the two positions just described corresponding to the various requirements of lift and flying speed.

When in the position shown by Fig. 3, the tiltable wings are disposed in a staggered formation with a gradually increasing intermediate gap.

The stabilizer shown at 28 being adjusted to various positions simultaneously with the tiltable wings and corresponding thereto will maintain the airplane at all angles of incidence in longitudinal balance, whereby a very high degree of safety is obtained.

Of course, I do not limit myself to the construction as shown and described allowing for various modifications in the general arrangement and the details of construction within the skill of those versed in this art.

I claim:

1. In an airplane, the combination with the fuselage, of a stationary main wing extending across the front end of said fuselage, tiltable wings journalled on said fuselage in staggered formation so as to form in their normal positions a downwardly curved continuation of said stationary wing, means for simultaneously varying the positions of said tiltable wings, and a movable stabilizer disposed at the tail end of said fuselage and operatively connected with said means to be adjusted thereby to different positions corresponding to the positions of said tiltable wings.

2. In an airplane, the combination with the fuselage, of a stationary main wing extending across the front end of said fuselage, tiltable wings journalled on said fuselage in staggered relation so as to form in their normal positions a downwardly curved continuation of said main wing, means for simultaneously varying the positions of said tiltable wings, and a movable stabilizer disposed at the tail end of said fuselage and operatively connected with said means so that upon a decrease in the incidence of said stabilizer the incident of said stabilizer increases.

3. In an airplane, the combination with the fuselage, of a stationary main wing extending across the front end of said fuselage, two series of short-span tiltable wings provided on either side of said fuselage in staggered formation so as to form in their normal positions a downwardly curved continuation of said main wing, means for simultaneously varying the positions of all said tiltable wings, and a movable stabilizer disposed at the tail end of said fuselage and operatively connected with said means to be adjusted thereby to different positions corresponding to the varied incidence of said tiltable wings.

4. In an airplane, the combination with the fuselage, of a stationary main wing extending across the front end of said fuselage, two series of short-span tiltable wings provided on either side of said fuselage in staggered formation so as to form in their normal positions a downwardly curved continuation of said main wing, means for simultaneously varying the positions of all said tiltable wings, and a movable stabilizer disposed at the tail end of said fuselage and operatively connected with said means to be adjusted thereby to different positions corresponding to the varied incidence of said tiltable wings, and ailerons disposed at the rear edge of said main wing at the end thereof.

5. In an airplane, the combination with the fuselage, of a stationary main wing extending across the front of said fuselage, a series of tiltable wings mounted on either side of said fuselage in staggered formation so as to form in their normal positions a downwardly curved continuation of said main wing, a system of levers operatively connected with said tiltable wings, a manually operated lever for controlling said levers to thereby simultaneously vary the positions of said tiltable wings, and a movable stabilizer disposed at the tail end of said fuselage and being so connected to said system of levers as to be moved thereby to various positions corresponding to the positions of said tiltable wings.

6. In an airplane, the combination with the fuselage, of a stationary main wing extending across the front of said fuselage, a series of tiltable wings mounted on either side of said fuselage in staggered formation so as to form in their normal positions a downwardly curved continuation of said main wing, a system of levers operatively connected with said tiltable wings, a manually operated lever for controlling said levers to thereby simultaneously vary the positions of said tiltable wings, and a movable stabilizer disposed at the tail end of said fuselage and being so connected to said system of levers as to be moved thereby to various positions corresponding to the positions of said tiltable wings, the said levers being of successively decreasing length, and ailerons provided at the rear edge of said main wing at both ends thereof.

In testimony whereof I affix my signature

WILLIAM ROBERTS.